United States Patent
Kunze et al.

(10) Patent No.: US 11,615,724 B2
(45) Date of Patent: Mar. 28, 2023

(54) HORIZONTAL POSITION DETERMINATION FOR DISPLAYING VIRTUAL OBJECTS IN A HEAD-UP DISPLAY

(71) Applicant: Volkswagen Aktiengesellschaft, Wolfsburg (DE)

(72) Inventors: Alexander Kunze, Berlin (DE); Ulrich Wuttke, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/492,293

(22) Filed: Oct. 1, 2021

(65) Prior Publication Data
US 2022/0108640 A1 Apr. 7, 2022

(30) Foreign Application Priority Data

Oct. 5, 2020 (DE) .................. 102020212520.1

(51) Int. Cl.
*G09G 3/00* (2006.01)
*G01C 21/36* (2006.01)
*B60K 35/00* (2006.01)

(52) U.S. Cl.
CPC ............ *G09G 3/002* (2013.01); *B60K 35/00* (2013.01); *G01C 21/365* (2013.01);
(Continued)

(58) Field of Classification Search
CPC ........... G09G 3/002; G09G 2340/0478; G09G 2380/10; B60K 35/00; B60K 2370/1529;
(Continued)

(56) References Cited

U.S. PATENT DOCUMENTS

| | | | |
|---|---|---|---|
| 8,692,739 B2 | 4/2014 | Mathieu et al. | |
| 2007/0139176 A1* | 6/2007 | Victor | ................ G01C 21/3658 701/301 |
| 2010/0070162 A1* | 3/2010 | Aihara | ................... G08G 1/005 701/533 |
| 2015/0277113 A1 | 10/2015 | Border et al. | |
| 2018/0113307 A1* | 4/2018 | Kasazumi | ............ H04N 13/363 |

(Continued)

FOREIGN PATENT DOCUMENTS

DE 102011082606 A1 3/2013
DE 102015006640 A1 3/2016
(Continued)

OTHER PUBLICATIONS

EP Application No. 21196391.3. Extended Search Report (dated Mar. 3, 2022).

*Primary Examiner* — Brent D Castiaux
(74) *Attorney, Agent, or Firm* — Loza & Loza, LLP; Peter Zura (57) ABSTRACT

A head-up display and a method for operating a head-up display for a motor vehicle. Virtual objects may be assigned to parts of the environment of the motor vehicle, where a virtual reference feature is obtained, the orientation of which is defined on the basis of a roadway that is or can be used by a vehicle. An orientation of the motor vehicle may be determined in relation to the virtual reference feature. A virtual object may be displayed when the part of the environment to which it is assigned lies within a field of view for the head-up display, wherein a horizontal position of the object that is displayed is defined in the field of view on the basis of the relative orientation to the virtual reference feature.

19 Claims, 3 Drawing Sheets

(52) U.S. Cl.
CPC ............... *B60K 2370/1529* (2019.05); *B60K 2370/166* (2019.05); *B60K 2370/52* (2019.05); *G09G 2340/0478* (2013.01); *G09G 2380/10* (2013.01)

(58) Field of Classification Search
CPC .......... B60K 2370/166; B60K 2370/52; B60K 37/00; G01C 21/365; G01C 21/3658; G01C 21/3632; B62D 15/029; G08G 1/096827; G08G 1/0962; G08G 1/096861; G02B 27/0101; G02B 27/0179; G02B 2027/0141; G06T 11/00; G06F 3/14
See application file for complete search history.

(56) References Cited

U.S. PATENT DOCUMENTS

| | | | |
|---|---|---|---|
| 2018/0322673 A1 | 11/2018 | Choi et al. | |
| 2019/0043392 A1 | 2/2019 | Abele | |
| 2019/0283778 A1 | 9/2019 | Dias et al. | |
| 2019/0316928 A1* | 10/2019 | Bagschik | B60K 35/00 |

FOREIGN PATENT DOCUMENTS

| | | |
|---|---|---|
| DE | 102016203080 A1 | 8/2017 |
| DE | 102019000901 A1 | 7/2019 |
| DE | 102018203927 A1 | 9/2019 |
| DE | 102019206490 B3 | 3/2020 |
| DE | 102019212601 A1 | 2/2021 |
| FR | 3060774 A1 | 6/2018 |
| WO | 2005053991 A1 | 6/2005 |

* cited by examiner

HORIZONTAL POSITION DETERMINATION FOR DISPLAYING VIRTUAL OBJECTS IN A HEAD-UP DISPLAY

CROSS REFERENCE TO RELATED APPLICATION

The present application claims priority to German Patent Application No. DE 102020212520.1, to Alexander Kunze, filed Oct. 5, 2020, the contents of which being incorporated by reference in its entirety herein.

FIELD OF TECHNOLOGY

The present disclosure relates to technologies and techniques for operating a head-up display such as one configured for a motor vehicle. The motor vehicle (or "vehicle") can be an automobile or a truck.

BACKGROUND

Head-up displays (HUDs) for showing virtual objects, or, in other words, virtual content in a driver's field of view are known in the automotive industry. From the perspective of the driver, the virtual objects are superimposed on the environment. These objects can be displayed in the known manner on the inside of a screen, for example, by projecting the objects thereon. Separate projection surfaces, and transparent projection screens in particular, on which the objects are projected, are also known. The technological background for head-up displays in general is disclosed, e.g., in US 2019/0043392 A1 and FR 3 060 774 A1.

A head-up display with expanded reality is known from DE 10 2019 206 490 B3. Graphics are shown thereon as a function of the distance of the motor vehicle to an object in the environment of the motor vehicle.

To be able to show the objects as reliably as possible, and plan in an anticipatory manner, it is known to regard or generate virtual models of a motor vehicle's environment. Virtual objects that can be shown are assigned to specific parts of a vehicle's environment, such that they are positioned in the model of the environment. As soon as these objects, or the part of the environment to which they are assigned, enter the field of view of the head-up display, or, in other words, overlap such a field of view, or overlay it, the objects can be shown. From the perspective of the driver, the objects are then shown in the correct position, and/or anchored to a location within the environment.

Objects can also be assigned to real regions in the environment (and modeled with regard to a model of the environment, for example), and they can also be depicted in relation to the location and/or in perspective, and in particular three dimensionally. This is typical for expanded reality head-up displays. Such objects can also be referred to as contact-analog objects or display elements. This can relate to highlighting real objects in the environment (e.g., by framing them), such as traffic signs. These objects can also be navigation instructions, e.g., turning arrows, or arrows indicating the direction of travel in general, which are assigned to specific roadways or intersections, for example. Destination flags or other location indicators can also be displayed.

General instructions that are not necessarily assigned to a specific object in the environment, but only refer to a certain part of the environment, can also be shown. These can be warnings such as a symbol for icy conditions or speed limits, for example. This information can be assigned to specific parts of the environment in an environment model, and be displayed when the motor vehicle enters this region and/or the part of the environment is within the field of view.

It has been realized that this approach does not yet succeed in the desired manner at present. As a result, erratic and/or non-intuitive displays, and in particular changes in the positions of displayed objects, may occur from the perspective of the driver when the orientation of the vehicle changes in relation to an object that is displayed, or a part of the environment that the object is assigned to.

Another disadvantageous situation is when the object or the part of the environment does not overlap the field the field of view, at least briefly, e.g., because the vehicle is turning. At this point, the object disappears at least temporarily from the display, from the driver's perspective. At this point, the driver may not have begun or completed a driving maneuver relating to the object. Furthermore, the object may unexpectedly reappear when the part of the environment returns to the field of view and/or it may reappear in an unexpected position.

There is therefore a need for objects to be reliably displayed with a head-up display, in particular when the objects are assigned to parts of the environment of the motor vehicle.

This is achieved with features recited in the independent claims below, and a head-up display that has the features of the coordinate independent claim. Advantageous developments are further described in the dependent claims.

SUMMARY

In some examples, a position may be determined, such as a horizontal position, depending on the relative orientation of the vehicle to a virtual reference feature. As such, objects that are to be displayed may be assigned to parts of the environment, e.g., in an environment or proximity model for the vehicle, and displays are generated (in particular of the objects themselves) on the basis of a relative orientation of the vehicle to the part of the environment.

In conventional configurations, it may be difficult to determine this orientation quickly and reliably enough while the vehicle is traveling and in realtime. From the perspective of the driver, delayed and therefore less intuitive position adjustments and displays may take place if the driver turns the vehicle. It has also be seen that in certain driving situations, an initial positioning, and in particular a horizontal positioning of the display on the basis of the orientation to the environment may lead to less intuitive and in particular off-center initial displays of objects.

According to some aspects of the present disclosure, other types of virtual reference feature may be defined that enable a more intuitive display and in general a more appropriate (in particular, horizontal) positioning of a display of an object. The use of a virtual reference feature that may be defined on the basis of a roadway, and in particular its direction or course, may be advantageous.

In some examples, a method for operating a head-up display for a motor vehicle is proposed, in which parts of the motor vehicle's environment can be assigned virtual objects (or also assigned as a separate measure in the framework of the method, and/or assignments are obtained), wherein the method comprises:

obtaining a virtual reference feature, the orientation of which is defined on the basis of a roadway that is or can be used by the motor vehicle (and in particular its course and/or direction);

determining an orientation of the motor vehicle in relation to the virtual reference feature;

displaying a virtual object when the part of the environment assigned to this object lies within a field of view for the head-up display, wherein a horizontal position of the object that is displayed in the field of view depends on the relative orientation to the virtual reference feature.

The method can also include generating the virtual reference feature. This can take place while the vehicle is being operated, and in particular in real-time, e.g., when the vehicle approaches a part of the environment that has virtual objects assigned to it. Alternatively, corresponding parts of the environment can be assigned virtual reference features that were generated in advance, and these can be obtained by querying a database and/or from an external server.

The method can be controlled in general by a computer, e.g., a control unit for a head-up display such as that disclosed herein. The control unit can comprise at least one processor and/or at least one memory. Program statements can be stored on the memory with which the processor causes the control unit to execute the steps or measures specified herein. By way of example, the control unit can obtain information relating to the assignment of at least one virtual object to a part of the environment after a desired route has been entered through querying a database from an external server. Alternatively, it can also make this assignment itself. The control unit can subsequently determine, preferably continuously, the position of a field of view in the head-up display, e.g., in the (global) coordinate system for a model of the environment (also referred to herein as a proximity model). The at least partial concealment of the field of view and part of the environment can then be determined, and the control unit can control the head-up display (in particular the image-generating units thereof) in the manner known per se to generate desired virtual displays of objects.

The head-up display may include any of the variants or developments described herein, e.g., by including a control unit, processor, and/or memory. All of the embodiments for and developments of method features disclosed herein can be applied to the same features of the head-up display, or belong thereto.

BRIEF DESCRIPTION OF THE DRAWINGS

Exemplary embodiments of the present disclosure shall be explained below in reference to the schematic drawings below. Therein.

DETAILED DESCRIPTION

As shall be explained below, the virtual reference feature may be considered a line or surface area, which may be orthogonal to a roadway, and in particular the direction of the roadway. The relative orientation can be regarded as an angle between the motor vehicle (e.g., between the longitudinal axis of the motor vehicle and/or its direction of travel) and the reference feature. Value ranges, functions, or relationships in general to the horizontal position of an object display can be determined in advance for the relative orientation and in particular such an angle. If the driver drives in a straight line toward the reference feature, for example, the relative orientation, and in particular the angle, can be 90°, for example. In this case, the display can be horizontally in the middle of the field of view. If the vehicle turns in relation the reference feature, the horizontal position can be adjusted accordingly.

That this is intuitive from the perspective of the driver is advantageous, as if the display takes place at a center of an intersection, to which the motor vehicle is typically offset when approaching the intersection. This center of the intersection is normally selected as the part of the environment to which a navigation instruction is assigned as a virtual object (such as a turning arrow). With the approach disclosed herein, in which the position of a display is preferably exclusively determined on the basis of a relative orientation to the reference feature and/or independently of the orientation to the part of the environment, the display of the object is more intuitive.

The method can also include a separate step for determining that a part of an environment is or will soon be located within the field of view for the head-up display (HUD). If this is the case, the reference feature can then be defined and/or obtained, at the latest, and the relative orientation can be determined for this. The virtual object can then be generated and/or horizontally position in the field of view.

The assignment of the virtual object to the part of the environment can take place virtually, e.g., by determining this in a database and/or by associating or assigning environment coordinates for the part of the environment to the virtual object. In particular, the virtual object can be positioned virtually in or on the part of the environment, e.g., in a model of the environment. This can also mean that the object can be assigned in accordance with coordinates for the part of the environment in the model of the environment, or its coordinate system. In other words, the object can thus be distinctly located and/or positioned in the model of the environment through a corresponding assignment. The virtual reference feature can also be defined and/or positioned in a model of the environment by means of any of the variants specified herein.

The part of the environment can also be purely virtual. It can thus correspond to a region in the model of the environment, and comprise a corresponding number of points or coordinates. It can be distinctly assigned to and/or correspond to a real part of the environment.

The position of the motor vehicle can also be determined in the model of the environment in a manner known per se, e.g., on the basis of positioning systems, e.g. a GPS-based positioning system. It is also known to determine the orientation of a field of view for a head-up display, e.g., in a motor vehicle coordinate system. In this case, the field of view is a field, surface area, or region in general in which objects can be displayed with the head-up display, and projected in particular therein. The position of the field of view within the motor vehicle can be determined, for example, on the basis of where the head-up display is installed in the motor vehicle, and/or on the basis of the settings of optical components in the head-up display in particular, as long as these can be varied, e.g., for varying an EyeBox by the driver.

The position of the field of view within the model of the environment can also be determined from a known relative position of the motor vehicle (and in particular its coordinate system) to the environment (and in particular a global coordinate system for a model of the environment), and in particular with which parts of the environment it overlaps and/or which parts of the environment are currently within the field of view (such as overlapping, concealing and/or comprised within the field of view). Current vehicle parameters can be drawn on for this, e.g., suspension settings that have an effect on the vertical position of the driver's cab and/or the head-up display in relation to the roadway.

It is also possible to determine in this manner that a position of the part of the environment and/or objects assigned thereto is known in the model of the environment, as well as the position of a field of view and/or the part of the environment that is currently comprised within the field of view. This makes it possible to check whether or not a currently displayed object, or the part of the environment assigned this object is in the field of view.

In an analogous manner, the orientation of the vehicle to the virtual reference feature can also be determined in, and/or by means of, the model of the environment. The coordinates for the virtual reference feature and/or the vehicle, as well as its known dimensions and/or orientations can be drawn on for this.

In some examples, it may be first determined, for an initial displaying of the virtual object, that the part of the environment is at least partially within the field of view. If this is the case, at least a horizontal position for the display can be determined on the basis of the relative orientation to the reference feature. This can be maintained at least until a predetermined termination condition is satisfied (e.g., until the relative orientation and in particular an angle defining this, exceeds an acceptable limit). As shall be explained below, this can also comprise displaying the object at an edge, even though the part of the environment is no longer within the field of view, i.e., has exited it. The latter emphasizes the fact that the display can be substantially or exclusively dependent on the relative orientation to the reference feature, and not on the part of the environment.

In general, a vertical position for the display can be varied on the basis of the relative orientation to the part of the environment. It can therefore be determined and defined independently of adjustments to the horizontal position, and in particular independently of the orientation to the reference feature. According to one variant, the vertical position is constant, and the object is displayed in the middle along a vertical axis of the field of view, for example. The size of the display can also be variable, e.g., dependent on a distance to the part of the environment and/or the reference feature.

According to some aspects of the present disclosure, the reference feature may include a virtual line or a virtual surface area. These can span the roadway laterally, or run orthogonally to the roadway. By way of example, the roadway can run in general in a horizontal plane, and the virtual reference feature (in particular in the form of a line or surface area) can run in a vertical plane. These two planes can be at a right angle to one another.

According to some aspects of the present disclosure, the orientation of the reference feature is (or will be) defined on the basis of map data. These data can describe a position (in particular a direction or course) of the roadway. In particular, it can then be determined on the basis thereof, how the reference feature is to be oriented and/or aligned in the model of the environment (e.g., transverse to the roadway oriented in accordance with the map data).

A position of the reference feature along the roadway can be determined for example in that the reference feature is to assume a predetermined relative position to the part of the environment. By way of example, this can include or intersect the part of the environment, in particular when the target position is the center of an intersection or a point where a maneuver or the like is to take place. The reference feature can therefore include or be a virtual surface area that is transverse to the roadway, and comprises the part of the environment, and/or overlaps or intersects it.

In some examples, the reference feature differs from the part of the environment the object is assigned to. As specified above, it can overlap and/or intersect it. By way of example, the reference feature and the part of the environment can comprise different virtual areas in a model of the environment, and/or different groups of coordinates.

In some examples, the horizontal position of the object that is displayed can be varied according to stipulations for changes in the relative orientation. In particular, the relative orientation can be continuously detected and adjusted appropriately when the horizontal position changes, preferably in real-time. This preferably takes place continuously, without jumps. From the perspective of the driver, this can result in the displayed object following the movements of the vehicle, and in particular the steering thereof, horizontally, such that the depiction can take place in an intuitive manner.

In this context, it may be intuitively comprehensible if the horizontal position is varied in the opposite direction to a change in the relative orientation and/or in the opposite direction to a steering movement for this. This development can comprise, in particular, the horizontal position being displaced to the right in the case of a left-hand turn (resulting in a corresponding change in the relative orientation to the reference feature), and toward the left in the case of a right-hand turn.

As specified herein, the value describing (or defining) the relative orientation can be determined as an angle between the motor vehicle and the reference feature. This can be the angle between the direction of travel and/or a vehicle's (e.g., virtually extended) longitudinal axis and the reference feature, in particular an angle of intersection between them. This angle can be determined quickly and reliably and enables a displaying of virtual objects in the right position.

In general, the horizontal position can be in the middle when the angle is 90°, such that an object can then be displayed in the horizontal middle of the of the field of vision. Angles less than this can involve displacing in a first direction, and greater angles can involve displacement in the opposite direction. At angles greater than 180°, or negative angles, displays can no longer take place.

In some examples, if the part of the environment is no longer in the field of view, the object can still be displayed and/or positioned at an edge of the field of view. Additionally or alternatively, if the relative orientation assumes a defined (first) magnitude, the object can be at least temporarily displayed at a predetermined edge of the field of view. This magnitude can be the same as the exiting of the part of the environment from the field of view, and calculated accordingly, for example.

The displaying at the edge can at least take place until a defined (second) magnitude for the relative orientation has been exceeded, e.g., until an acceptable angle to the reference feature has been exceeded. This angle is 180° or more, and/or less than 0°, by way of example. If the part of the environment returns to the field of view (or the relative orientation re-assumes a corresponding magnitude), the horizontal position can preferably be varied again in accordance with the relative orientation.

The object may be displayed at a stationary horizontal position at the edge (preferably on the side, in general), such that it remains stationary there. This can be the edge that is closest to the part of the environment, and/or where the part of the environment exits the field of view. The object can be moved successively to the edge as a consequence of a changing relative orientation to the reference feature, and when the part of the environment exits the field of view, remain there, at least temporarily, or until the part of the environment no longer overlaps the field of view.

In this manner, an object that is relevant to the driver (e.g., a navigation instruction) can remain displayed even when the part of the environment only exits the field of view temporarily, or when it exits it for longer periods of time, or only slightly. This increases the probability that the driver will see the object. At the same time, this provides a more intuitive and less irritating possibility for the driver to deal with the exiting of a part of the environment assigned to the object from the field of view, for example, when the part of the environment overlaps the field of view, the display preferably follows changing relative movements or steering movements that cause this. When the part of the environment exits the field of view, the object is kept at an (in particular lateral) edge of the field of view (preferably that which is closest to the part of the environment). The horizontal position of the object is preferably no longer varied until the part of the environment re-enters the field of view, or an exceeding of the aforementioned angular limit for the relative orientation has been registered.

In summary, an object may be also displayed at the edge when the part of the environment to which the object is assigned lies outside the field of view. This differs from previous approaches in which the object is only displayed when the part of the environment it is assigned to lies within the field of view.

The present disclosure also relates to a head-up display for a motor vehicle, which is configured to execute a method according to any of the claims recited herein.

In particular, the head-up display can be configured to obtain (or to generate and thus obtain) at least one reference feature, the orientation of which is defined on the basis of a roadway that is used or can be used by the motor vehicle; determine an orientation of the motor vehicle in relation to the virtual reference feature; display a virtual object when the part of the environment it is assigned to is (at least partially) within a field of view for a head-up display, wherein the head-up display is also configured to determine a horizontal position of the object that is displayed in the field of view on the basis of the relative orientation to the virtual reference feature.

Figure 1:
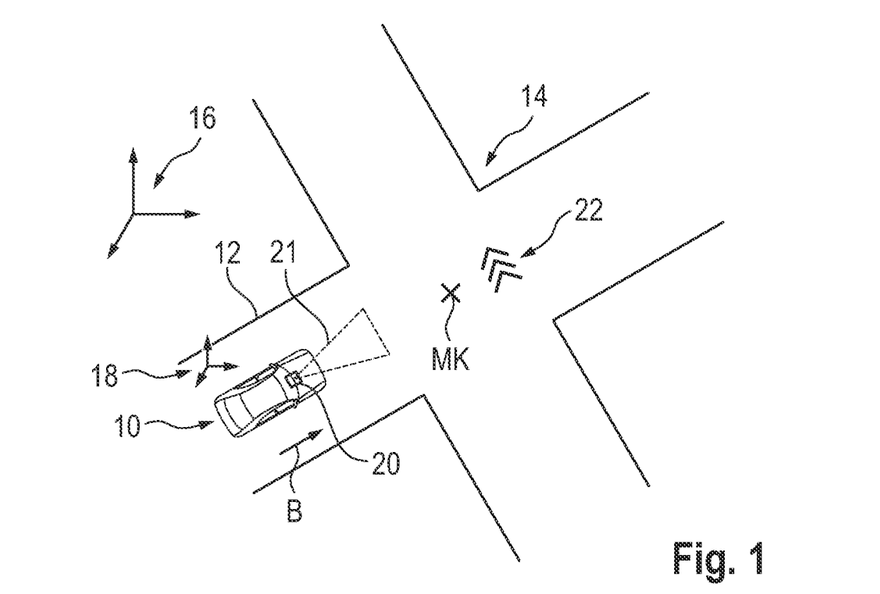
FIG. 1 shows a motor vehicle comprising a head-up display, with which methods disclosed herein may be is executed while the motor vehicle approaches an intersection according to some aspects of the present disclosure.

A driving situation for a vehicle 10 is shown in the example of FIG. 1, when it approaches an intersection 14 according to the arrow B and along a roadway 12. This illustration can correspond to a real driving situation. It can also be modelled accordingly in a model of the environment, as shall be explained below in reference to FIG. 2. The model of the environment is preferably abstract, however, and merely defines selected properties of the environment in the indicated global (environment) coordinate system 16.

A position of the vehicle 10, and preferably a (vehicle) coordinate system 18 connected to the vehicle can be determined in this global coordinate system 16. Coordinates defined in the vehicle coordinate system 18 can be transformed in a known manner into global coordinates in the global coordinate system 16. One example of coordinates defined in the vehicle coordinate system 18 are the coordinates of a head-up display 20 (also referred to below as an HUD 20). Coordinates of a field of view 21 can also be determined in the vehicle coordinate system 18. As explained in the introduction, these can also be positioned in a variable manner by displacing the HUD 20. In particular, a vertical and horizontal orientation of the field of view 21 can be defined from the perspective of the vehicle 10 or a driver therein by this means. The terms, "vertical" and "horizontal" can refer to vertical and horizontal spatial directions in which the vertical axis can correspond to an axis along which the force of gravity acts. The horizontal axis can be orthogonal to the vertical axis. An optional depth axis can run along or parallel to a vehicle's longitudinal axis.

A center MK of the intersection 14 may be defined in the global coordinate system 16 by way of example, and more precisely, defines its coordinates. This center MK of the intersection is assigned a visual or graphic navigation instruction 22 (depicted merely by way of example as three successive arrows, see the following figures). This assignment means that the position of the navigation instruction 22, which is a virtual object in this example, defined in the global coordinate system 16.

Instead of the center MK of the intersection, a point offset in relation thereto can also be defined as the point for the maneuver at which the navigation instruction 22 is to be displayed.

With the prior approaches, displays of this navigation instruction 22 could take place, from the perspective of the driver and according to the principles of known augmented reality HUDs, such that lay at the center MK of the intersection, or coincided optically therewith. As explained below, this only applies in the present case for a depth dimension in the direction of travel. A horizontal position of the display transverse thereto (and parallel to the roadway 12) is defined differently, in the manner explained below.

Figure 2:
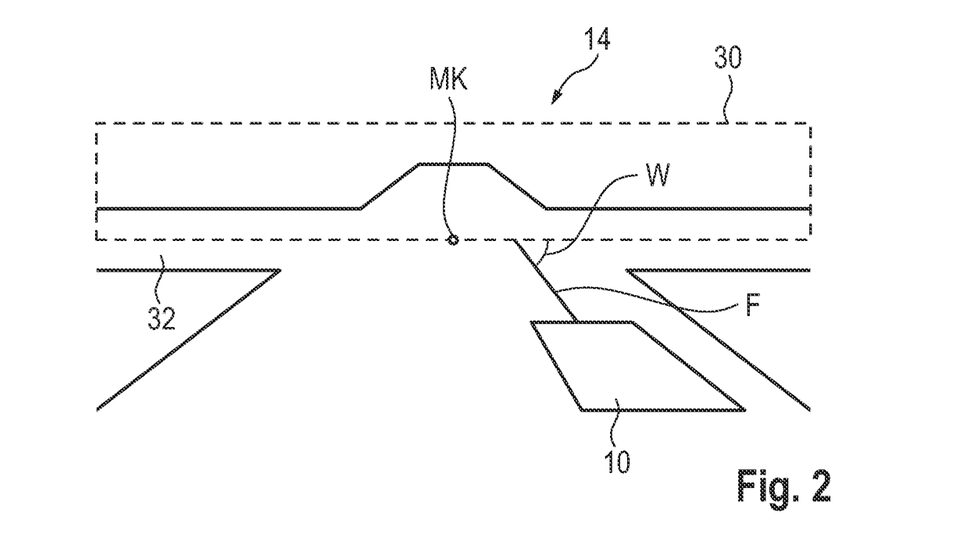
FIG. 2 shows a view of a model of the environment of the motor vehicle shown in FIG. 1 according to some aspects of the present disclosure.

A rotated view of the situation shown in FIG. 1 is shown in FIG. 2, as it can be modelled in a model of the environment. The vehicle 10 in this case is merely outlined schematically. A vector F indicating the direction of travel extends therefrom (corresponding to the direction of movement B in FIG. 1). This can correspond to an orientation of the vehicle's longitudinal axis, or define such, wherein the longitudinal axis is spatially oriented according to the dimensions of a steering angle set for the vehicle 10. The vehicle 10 travels in a straight line on the right side of the roadway, such that the vector F indicating the direction of travel runs along the direction of the roadway.

A virtual reference feature 30 can also be seen therein. This is a surface area outlined by a broken line, or it can be a virtual wall. This is defined such that it runs orthogonally to the roadway 12 on which the vehicle is travelling 10. An orientation of the roadway 12 can be determined in the global coordinate system 16 shown in FIG. 1 for this, based on map data, for example. The virtual wall 30 is then defined such that it is orthogonal to the surface of the roadway 12, or such that the roadway 12 is perpendicular to the virtual wall 30.

Furthermore, the virtual wall 30 is preferably defined such that it extends through the center MK of the intersection serving as the part of the environment taken into consideration here. The position of the virtual wall 30 along the roadway 12 is defined in this manner. Because the present case relates to an intersection in which the roadways 12, 32 cross-orthogonally, the virtual wall 30 follows an additional roadway 32 that is orthogonal to the roadway 12 on which the vehicle 10 is located.

A relative orientation is determined between the vector F for the direction of travel (or another arbitrary feature with which a position and/or orientation of the vehicle 10 can be defined) and the virtual wall 30. This is preferably described by the angle W, which forms the angle of intersection between the vector F for the direction of travel and the virtual wall 30. The angle W is consequently measured in the plane of the roadway 12, or a parallel plane thereto.

In the present case, it is possible to determine whether the part of the environment, or the center MK of the intersection lies in the field of view 21 for the HUD 20 based on the orientations defined on the basis of the model of the environment and/or in the environment coordinate system 16 (see FIG. 1). If this is the case, the orientation of the vehicle 10 in relation to the virtual reference feature in the form of the wall 30 can be determined, and the object (a navigation instruction 22) assigned to the center MK of the intersection can be displayed in the field of view 21. At least a horizontal position of this object displayed in the field of view 21 is defined and varied, in particular, on the basis of the relative orientation to the wall 30 that is determined.

Figure 3:
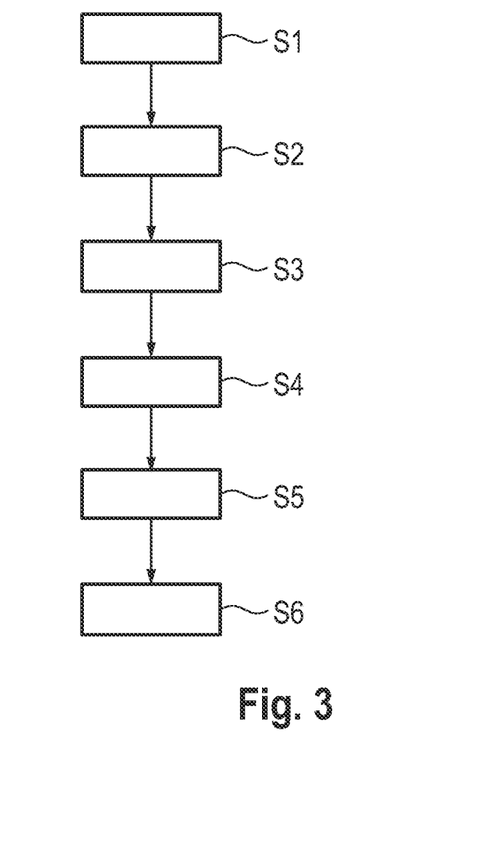
FIG. 3 shows a flow chart for the method executed in accordance with FIG. 1 and FIG. 2 according to some aspects of the present disclosure.

This approach is explained once again, separately, in reference to FIG. 3. Information relating to an assignment of the object that is to be displayed in the form of the navigation instruction 22 in relation to a part of the environment (the center MK of the intersection in the present case) is obtained in step S1. Alternatively, this assignment can be executed actively in step S1, e.g., by the HUD 20 or a control unit therein, not shown separately. The assignment comprises defining or obtaining the coordinates for the navigation instruction 22 in the global coordinate system 16.

A position of the field of view 21 in the global coordinate system 16 is continuously and/or repeatedly determined in step S2. It is then checked in step S3, repeatedly and/or cyclically, whether the field of view 21 at least partially shows or contains the part of the environment MK and in particular the object or navigation instruction 22 positioned therein. Alternatively, this can also require or check that it is entirely contained therein. The check can take place by comparing the coordinates for the field of view 21 and the part of the environment MK and/or the navigation instruction 22 positioned there in the global coordinate system 16. In doing so, it should be taken into account that both the field of view 21 and the navigation instruction 22 can be two dimensional, and accordingly comprise or can be assigned to a two-dimensional group of, or two dimensionally distributed, coordinates in the global coordinate system 16. If the coordinates for the navigation instruction 22 and/or the part of the environment MK are contained entirely within those for the field of view 21, the navigation instruction 22 can be shown entirely within the field of view 21 by a corresponding display thereof.

If it is determined in step S3 that the part of the environment MK is contained within the field of view 21, a virtual reference feature 30 is obtained in step S4. More precisely, this is defined (preferably in realtime) on the basis of map data and an orientation of the currently travelled roadway 12 in the global coordinate system 16 is defined by this. Alternatively, a previously defined reference feature 30 stored, for example, as part of the map data, can be retrieved and/or obtained or generated prior to step S3, e.g., when approaching the intersection 14.

The relative orientation of the vehicle 10 to the reference feature 30, and the angle W in FIG. 2 is determined in this example in step S5.

The HUD 20 generates a display of the navigation instruction 22 in step S6, wherein a horizontal position of this display is defined on the basis of the relative orientation from step S5.

It should be understood that the relative orientation obtained in step S5 can be determined continuously, and the position determined in step S6 can therefore also be updated continuously. If the relative orientation varies, e.g., due to a steering maneuver, the horizontal position in step S6 can be continuously adjusted from the perspective of the driver, such that the displayed navigation instruction 22 moves continuously within the field of vision 21.

Displays are shown by way of example in FIGS. 4A-F that can be generated in step S6 on the basis of the relative orientations that are obtained.

Figure 4A:
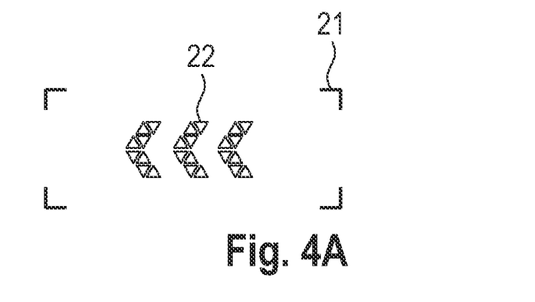
FIGS. 4A-F show views of a virtual object in a field of view in various operating situations, which can be generated with the above exemplary embodiments according to some aspects of the present disclosure.

The angle W is 90° in the example of FIG. 4A. This indicates that the vehicle 10 is travelling in a straight line toward the intersection 14. The navigation instruction 22 is positioned and displayed in horizontally in the middle of the field of view 21. This takes place even though it is clear that the part of the environment, or the center MK of the intersection is offset toward the left in relation to the vehicle 10 in FIG. 2. This relative offset is not reflected in the display, however, because the horizontal position of the displayed navigation instruction 22 is defined instead according to the dimension of the relative orientation (angle W) to the reference feature 30.

Figure 4B:
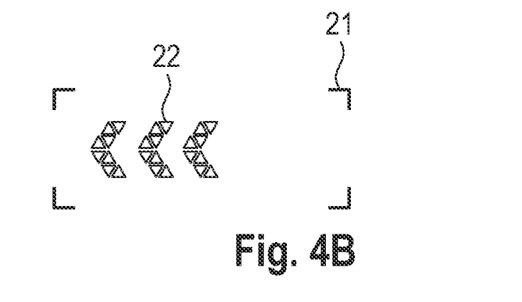

In the case shown in FIG. 4B, the angle is greater than 90°, where the vehicle turns toward the right in comparison with the state shown in FIG. 2. The navigation instruction 22 is then displaced toward the left in relation to the central display shown in FIG. 4A, thus moving in the direction opposite to the change in the relative orientation. The opposite is shown in FIG. 4D (steering to the left results in a horizontal shifting of the navigation instruction 22 toward the right).

As a result, intuitive displays and changes in position are obtained from the perspective of the driver, because the navigation instruction 22 then emphasizes the desired driving maneuver, and an orientation in relation to the environment is at least maintained in part in accordance with the state shown in FIG. 4A. In other words, the visual impression can be obtained in this manner that the central orientation shown in FIG. 4A corresponds to a target state and extensions of the field of view 21 in relation to this target state can be displayed through the opposing horizontal displacement of the navigation instruction 22.

Figure 4C:
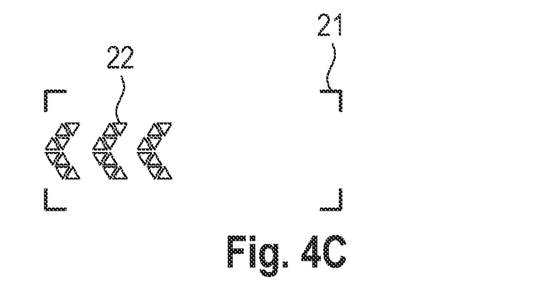
Figure 4D:
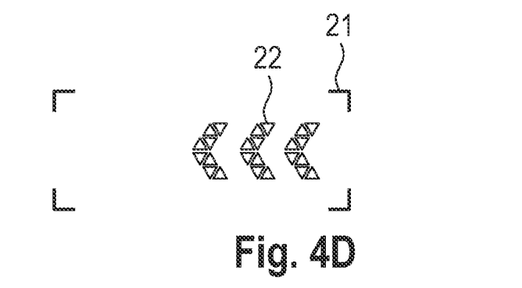
Figure 4E:
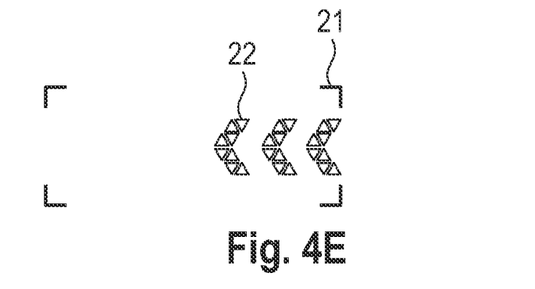
Figure 4F:
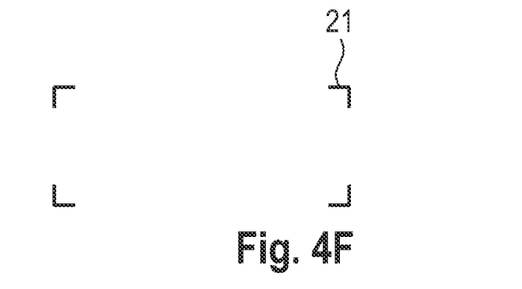

The navigation instruction 22 may be positioned on the left and right edges of the field of view 21 in FIGS. 4C and 4D. This occurs when the angle W exceeds an extent that corresponds to a state in which the part of the environment MK lies outside the field of view 21. In the present case, this angle W is ca. 120° (steering toward the left in FIG. 2), and 30° (steering toward the right in FIG. 2).

These limits for the angle can be defined and/or determined in advance, if necessary. There may not be any prior definition, however, and instead it is possible to check whether or not the part of the environment MK lies within the field of view 21 on the basis of a coordinate comparison. If it is outside the field of view 21, a corresponding critical angle W can be reached, and the display can be at the edge, without a separate checking of the angle.

According to the prior approaches, an object is no longer displayed once the associated part of the environment MK is no longer within the field of view 21. Instead, the navigation instruction 22 can still be displayed in the present case. This takes place at the lateral edge that is closest to the part of the environment MK, and/or where the part of the environment MK visually exited the field of view 21.

The display may be maintained at this location until the angle W exceeds an acceptable limit. This limit is a value greater than 180°, or a negative value in the present case. These values indicate that the vehicle has clearly followed or not followed the navigation instruction 22, such that it no longer applies.

If the driver steers toward the left, starting from the situation shown in FIG. 4C, and the part of the environment MK re-enters the field of view 21, the navigation instruction 22 is moved horizontally back toward the middle. It is then successively displaced horizontally to the position shown in FIG. 4B, and potentially beyond it.

LIST OF REFERENCE SYMBOLS

- 10 vehicle
- 12 roadway
- 14 intersection
- 16 global (environment) coordinate system
- 18 vehicle coordinate system
- 19 acceleration sensor
- 20 head-up display
- 21 field of view
- 22 virtual object (navigation instruction) that is to be displayed
- 30 virtual reference feature (virtual wall)
- 32 intersecting roadway
- W angle (of relative orientation)
- F vector for direction of travel
- MK part of the environment (center of intersection)
- B direction of movement for the vehicle

The invention claimed is:

1. A method for operating a head-up display for a motor vehicle, comprising:
   assigning one or more virtual objects to a part of the display environment;
   obtaining a virtual reference feature, the orientation of which is defined on the basis of a roadway that is, or can be, used by a vehicle;
   determining an orientation of the motor vehicle relative to the virtual reference feature; and
   displaying a virtual object when the part of the display environment to which it is assigned lies within a field of view for the head-up display, wherein a horizontal position of the virtual object is configured to be movably displayed independently, relative to the one or more virtual objects in the field of view on the basis of the relative orientation of the motor vehicle to the virtual reference feature.

2. The method of claim 1, wherein the virtual reference feature comprises at least a virtual line or a virtual surface area.

3. The method of claim 1, wherein the orientation of the reference feature is based on map data, which describe a position of the roadway, and/or that the reference feature runs at an angle to the roadway.

4. The method of claim 1, wherein the virtual reference feature differs from the part of the display environment to which the object is assigned.

5. The method of claim 1, wherein the horizontal position of the displayed object is varied according to the dimensions of the changes in the relative orientation.

6. The method of claim 5, wherein the horizontal position of the displayed object is varied in an opposite direction to a change in the relative orientation.

7. The method of claim 1, wherein an angle between the motor vehicle and the reference feature is determined as a value describing the relative orientation.

8. The method of claim 7, wherein, if the part of the environment is no longer within the field of view, the virtual object is displayed at least temporarily at an edge of the field of view.

9. The method of claim 8, further comprising displaying the virtual object at the edge when the part of the environment to which the virtual object is assigned lies outside the field of view.

10. A head-up display for a motor vehicle, comprising:
    a processor; and
    a memory, operatively coupled to the processor, wherein the processor and memory are configured to
      assign one or more virtual objects to a part of the display environment;
      obtain a virtual reference feature, the orientation of which is defined on the basis of a roadway that is, or can be, used by a vehicle;
      determine an orientation of the motor vehicle relative to the virtual reference feature; and
      display a virtual object when the part of the display environment to which it is assigned lies within a field of view for the head-up display, wherein a horizontal position of the virtual object is configured to be movably displayed independently, relative to the one or more virtual objects in the field of view, on the basis of the relative orientation of the motor vehicle to the virtual reference feature.

11. The head-up display of claim 10, wherein the virtual reference feature comprises at least a virtual line or a virtual surface area.

12. The head-up display of claim 10, wherein the orientation of the reference feature is based on map data, which describe a position of the roadway, and/or that the reference feature runs at an angle to the roadway.

13. The head-up display of claim 10, wherein the virtual reference feature differs from the part of the display environment to which the object is assigned.

14. The head-up display of claim 10, wherein the horizontal position of the displayed object is varied according to the dimensions of the changes in the relative orientation.

15. The head-up display of claim 14, wherein the horizontal position of the displayed object is varied in an opposite direction to a change in the relative orientation.

16. The head-up display of claim 10, wherein an angle between the motor vehicle and the reference feature is determined as the value describing the relative orientation.

17. The head-up display of claim 16, wherein, if the part of the environment is no longer within the field of view, the virtual object is displayed at least temporarily at an edge of the field of view.

18. The head-up display of claim 17, wherein the processor and memory are configured to display the virtual object at the edge when the part of the environment to which the virtual object is assigned lies outside the field of view.

19. A method for operating a head-up display for a motor vehicle, comprising:
    assigning one or more virtual objects to a part of the display environment;
    obtaining a virtual reference feature, the orientation of which is defined on the basis of a roadway that is, or can be, used by a vehicle;

determining an orientation of the motor vehicle relative to the virtual reference feature; and displaying a virtual object when the part of the display environment to which it is assigned lies within a field of view for the head-up display, wherein a horizontal position of the virtual object is configured to be movably displayed independently, relative to the one or more virtual objects in the field of view, on the basis of the relative orientation of the motor vehicle to the virtual reference feature, wherein the relative orientation comprises an angle between the motor vehicle and the reference feature.

\* \* \* \* \*